United States Patent [19]

D'Agostino et al.

[11] Patent Number: 5,182,779
[45] Date of Patent: Jan. 26, 1993

[54] DEVICE, SYSTEM AND PROCESS FOR DETECTING TENSILE LOADS ON A ROPE HAVING AN OPTICAL FIBER INCORPORATED THEREIN

[75] Inventors: William L. D'Agostino, Irving; Michael D. Barrick; Glen R. Williams, both of Arlington, all of Tex.

[73] Assignee: LTV Aerospace and Defense Company, Grand Prairie, Tex.

[21] Appl. No.: 506,034

[22] Filed: Apr. 5, 1990

[51] Int. Cl.$^5$ ............................................... G02B 6/44
[52] U.S. Cl. ...................................................... 385/13
[58] Field of Search ................ 350/96.23, 96.15, 96.16

[56] References Cited

U.S. PATENT DOCUMENTS

| | | | |
|---|---|---|---|
| 4,269,506 | 5/1981 | Johnson | 356/5 |
| 4,295,738 | 10/1981 | Meltz | 356/32 |
| 4,555,175 | 11/1985 | Gardner | 356/32 |
| 4,653,906 | 3/1987 | Dunphy | 356/32 |
| 4,725,110 | 2/1988 | Glenn | 350/3.61 |
| 4,751,690 | 6/1988 | Krueger | 367/149 |
| 4,772,092 | 9/1988 | Hofer | 350/96.24 |
| 4,778,246 | 10/1988 | Carroll | 350/96.23 |
| 4,820,012 | 4/1989 | Asai | 350/96.23 |
| 5,026,141 | 6/1991 | Griffiths | 350/96.23 |

OTHER PUBLICATIONS

Garside, et al., "A Photon Counting Optical Time-Domain Reflectometer for Distributed Sensing Applications," *Society of Photo-Optical Instrumentation Engineers, Proceedings of Fiber Optic and Laser Sensors VII*, vol. 1169, Paper 11, Sep. 5-8, 1989.

Meltz, et a l., "Formation of Bragg Gratings in Optical Fibers by a Transverse Holographic Method," 14 Optics Letters, No. 15, p. 823, (Aug. 1, 1989).

Yariv, *Optical Electronics*, pp. 87-95, title page and table of contents, ISBN-0-03-070289-5, CBS College Publishing, Jan. 1985; gives a general description of a Fabry-Perot eltalon (interferometer).

*Primary Examiner*—John D. Lee
*Assistant Examiner*—Robert E. Wise
*Attorney, Agent, or Firm*—Richards, Medlock & Andrews

[57] ABSTRACT

A system for monitoring strains and stresses on rope structures and rigid structures containing the ropes is provided wherein a fiber optic is included in a rope structure and change in the fiber's light transmissive/reflective properties, which are caused by strains and stresses on the fiber, are monitored.

38 Claims, 3 Drawing Sheets

DEVICE, SYSTEM AND PROCESS FOR DETECTING TENSILE LOADS ON A ROPE HAVING AN OPTICAL FIBER INCORPORATED THEREIN

BACKGROUND OF THE INVENTION

Mankind has been using ropes made from natural fibers for thousands of years. In addition, wire ropes and cables made from metallic filaments have been in use for hundreds of years. Because of the history of ropes, ropes, and cables, there is ambiguity about the precise definitions and uses of the terms rope, wire rope, cable. Traditionally, many people define ropes as being made from natural or polymeric fibers, wire ropes as being made from metallic filaments, and cables as being made from all of the above. Herein, the term "rope" refers to rope, wire rope and cable.

Almost any type of material which can be twisted, pulled, extruded, spun, stretched, or otherwise fabricated into a filament or fiber can be used to make ropes. Basically, a rope is a structural element which is fabricated from any collection of elongated members, such as filaments or fibers, which are manufactured into some type of a long, structural line which is relatively flexible and capable of carrying tensile loads.

A non-exclusive list of definitions of various elongated members used in ropes includes:

(a) Fiber—A natural or synthetic thread which is usually relatively short.

(b) Filament—A natural or synthetic thread which is usually relatively long.

(c) Wire—A filament which is usually drawn from pure or alloyed metals.

(d) Yarn—A group of twisted (spun or braided) fibers, filaments, and/or wires.

(e) Cord—A group of twisted (spun or braided) yarns.

(f) Strand—A group of twisted yarns or cords; typically, small diameter ropes will have its strands fabricated from yarns whereas larger ropes will use cords.

Most common ropes are manufactured by the following process:

(1) Relative short to moderately long filaments or fibers are twisted into yarns.

(2) Yarns are twisted into cords.

(3) Cords are twisted into strands. This process is called "forming." Sometimes, extra cords, yarns, and/or filaments (made from relatively flexible materials) are added during the forming process for internal lubrication in each strand. These extra cords, yarns, and/or filaments are commonly used during the fabrication of ropes that are subjected to relatively high flexural loads.

(4) Two or more strands are twisted into a rope. This process is called "laying." Similar to Step 3, extra strands, cords, yarns, and/or filaments (made from relatively flexible materials) can be added during the laying process to improve internal lubrication in the rope.

(5) Two or more ropes are twisted into a wire rope or cable. Similar to Step 4, extra elongated members can be added to improve internal lubrication in the cable.

Since each of the above manufacturing steps can have many different variations, there is almost an infinite number of different types of ropes which this basic process can produce. Common examples of some of the variations include:

(a) Varying the numbers of elongated members per rope.

(b) Using two or more different material types of elongated members per yarn.

(c) Varying the diameters of the elongated members.

(d) Varying the number of twists per unit length of the elongated members.

(e) Using different combinations or diameters of elongated members per rope.

(f) Varying the direction of rotation of one or more of the elongated members.

(g) Varying the direction of twists per unit length of one or more of the elongated members.

(h) Varying the number of extra elongated members for internal lubrication.

Many ropes have external materials applied to the yarns, cords, or strands to improve environmental resistance, as well as handling characteristics. Application processes for these materials include galvanizing, bonding, painting, and coating. Some typical examples of how the characteristics of a rope can vary by using these manufacturing variations include:

(a) Ropes that are made from thick filaments will be stiffer than ropes from thinner filaments.

(b) Ropes that use additional elongated members for internal lubrication will have improved bending capabilities and a longer service life than ropes which do not use extra elongated members for internal lubrication.

(c) Ropes that are made with the yarn twist in the opposite direction as the cord twist will have greater torsional stability than ropes with both twists in the same direction. Likewise, ropes that have their cord twist and strand twist in opposite directions will have greater torsional stability than ropes with both twists in the same direction. This rule is also true when the direction of the strand twist is opposite to the rope twist.

(d) Ropes which are fabricated with the strands twisted in the same direction as the overall rope twist direction have improved resistance to surface wear (due to a larger exposed surface area) than ropes which have the strand twist and a rope twist in opposite directions.

In recent years, it has been discovered that stresses and strains on optical fibers change the way in which light is reflected and transmitted through the fiber. The type of stress or strain and the area of the fiber in which the stress or strain is being applied may be calculated or determined by monitoring the change in characteristics of reflected or transmitted light in the fiber.

Such fibers have been incorporated into laminated structures, commonly known as smart structures, the common characteristic to the earlier structures being their rigid (substantially inflexible) nature.

SUMMARY OF THE INVENTION

The present invention makes use of the ability to monitor strains on an optical fiber to monitor loads on rope structures, by incorporating fiber optics with the rope structure.

According to one embodiment of the invention, there is provided a rope which includes a plurality of elongated load-bearing members, wherein at least one of the elongated members is a fiber optic.

According to another embodiment of the invention, there is provided a system for detecting stimulus on a rope. The system includes a plurality of elongated members arranged in the shape of a rope, wherein at least one of the elongated members is a fiber optic; an input signal transmitter, such as a laser; and a signal monitor which monitors electromagnetic radiation exiting from the fiber optic and compares an observed set of characteristics of the exiting electromagnetic radiation to an expected set of characteristics.

According to yet another embodiment of the invention, a process for detecting stimulus on a rope containing a fiber optic is provided, comprising the steps of:

(1) transmitting a reference input signal into the fiber optics;

(2) monitoring the transmitted reference output signal exiting the fiber optic; and (3) analyzing the change between the characteristics of the reference input signal and the characteristics of the reference output signal to detect the stimulus on the rope.

Embodiments of the invention are discussed herein based on electromagnetism, which includes the general wave theory and particle theory of light. The general wave theory can be approximated by the ray (geometrical optics) theory of light or more rigorously by Maxwell's equations (wave theory) incorporating the proper boundary conditions. Likewise, the particle theory is best described by quantum mechanics, which is needed to explain the interactions among photons, electrons, ions, and atoms. Those skilled in the art will recognize that empirical calibration/baseline relationships among the various physical changes in the environment of the invention may be developed with respect to the changes in transmitted/reflected light to calculate the desired monitoring of the specific event. The methods of baseline calculation disclosed herein are given as examples and are not intended to represent every baseline calculation method that is within the scope of the invention.

BRIEF DESCRIPTION OF THE DRAWINGS

For a more complete understanding of the present invention and for further advantages thereof, reference is made to the following Detailed Description of Embodiments of the Invention taken in conjunction with the accompanying Drawings, in which.

DETAILED DESCRIPTION OF EMBODIMENTS OF THE INVENTION

Figures 1A, 1B:
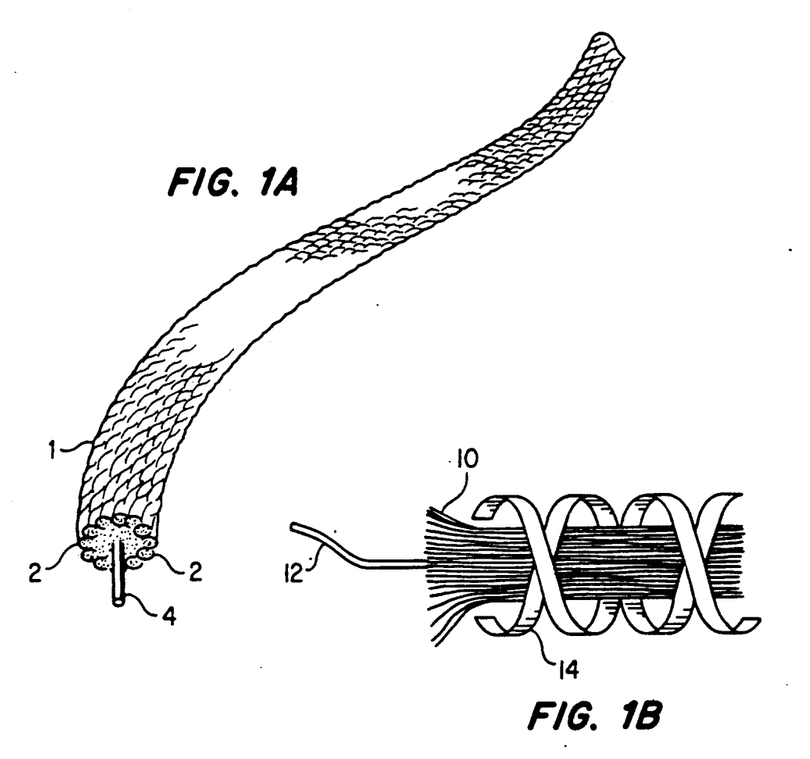
FIG. 1A shows an embodiment of the invention that is made as a common rope.
FIG. 1B shows an embodiment of the invention that is made as a selvage rope.

Typical rope manufacturing methods can be used to make the invention, but there are other manufacturing techniques that will also suffice. For example, a selvage style rope is a rope which is not fabricated by the commonly used twisting processes. Typically, a selvage rope is fabricated by aligning a majority of its filaments or fibers parallel (with little or no twist) and constraining these filaments by wrapping small cords or ropes around them. FIG. 1A shows an embodiment of the invention, manufactured as a common rope 1 having twisted strands 2 including a fiber optic 4. FIG. 1B shows an embodiment of the invention manufactured as a selvage style rope having parallel elongated members 10, including fiber optic 12, and binding members 14, wrapped around elongated members 10.

Figure 1C:
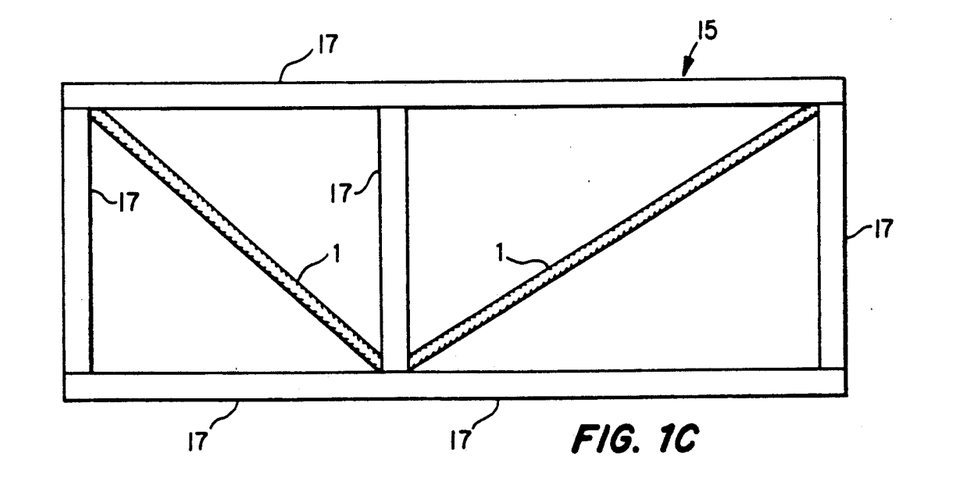
FIG. 1C shows a structural element whose loads are known through monitoring the loads on tension bearing members.

FIG. 1C shows an example of a structural element in which loads on the structural element are known through monitoring the loads on tension bearing members. In the embodiment shown, the structural element is a truss 15, as might be used in the wing of an aircraft. Truss 15 is made of rigid members 17, which are supported by rope 1. Rope 1 contains fiber optic 4, as shown in FIG. 1A, and bears tension loads along its axis.

In another embodiment of the invention, a rope is made by commingling the fiber optic sensors with structural filaments or fibers during the fabrication process of making yarns. In addition, the fiber optic sensors are preformed to reduce or eliminate residual stresses which are created during the yarn making process. Preforming is the process of twisting an elongated member, such as a filament (or the like) in the opposite direction as the twisting process to make a cord, yarn, strand so that the elongated member is relatively untwisted in the manufactured cord, yarn, or strand.

In an embodiment wherein the rope is capable of carrying more load than the fiber optic, prestressing the rope helps reduce the chance that the fiber optic will break before the rope reaches its maximum load.

In some embodiments, the commingling operation of incorporating fiber optic sensors with structural filaments can be assisted by adding chemical lubricants as well as using chemical bonding agents, primers, sealants, or coatings. Additional filaments can be incorporated into the yarn to help improve the structural integrity of the yarn and to increase the service life of the fiber optic sensors. After the yarn is fabricated, the rest of the rope is manufactured by conventional means.

In another embodiment, the fiber optic sensors are commingled with structural yarns during the fabrication process of making cords. Again, the fiber optic sensors or yarns can be preformed to reduce or eliminate residual stresses created during the cord making process. The incorporation of fiber optic sensors with structural yarns can be assisted by adding chemical lubricants, bonding agents, primers, sealants, or coatings. Again, extra elongated members can be incorporated into the cord to help improve the structural integrity of the cord and to increase the service life of the fiber optic sensors.

In still another embodiment of the invention, at least one fiber optic sensor is commingled with structural cords during the fabrication process of making strands.

Again, the fiber optic sensors or cords are preformed to reduce or eliminate residual stresses. The commingling operation can be assisted by adding chemicals, additional filaments, fibers, yarns, or cords.

In another embodiment, the fiber optic is commingled with structural strands while making the rope. Again, the fiber optic sensors or strands are preformed and the commingling can be assisted by adding chemicals as above. Additional filaments, fibers, yarns, cords, or strands also can be incorporated.

In a further embodiment, wrapping, instead of commingling, the fiber optic sensors around elongated members is the manufacturing technique.

In yet further embodiments, the fiber optic sensors are commingled with non-structural filaments which are added for improved internal lubrication; the fiber optic sensors are wrapped around non-structural filaments that are added for improved internal lubrication; or the fiber optic is chemically bonded to the exterior of a yarn, cord, strand, or rope. For example, if one or more fiber optic sensors are bonded to a cord, then the remaining rope making processes would be unchanged. Likewise one or more fiber optic sensors can be bonded to the exterior of a rope.

Embodiments of the invention are also made using combinations of the above processes. For example, one embodiment is fabricated with fiber optic sensors which are commingled with the structural fibers during the yarn making procedure, and have an additional set of fiber optics sensors commingled during the strand making procedure. Alternatively, other embodiments are made where the fiber or elongated element is not preformed or prestressed.

In general, the sensing process begins when some physical phenomenon (sometimes referred to as "physical parameters" or an "external parameter") modifies light that is propagating in an optical fiber. The general structure of fiber optics, light propagation, and some sensing techniques is described in *Fiberoptic Sensor Technology Handbook*, by Davis, C. M. et al.; published by Optical Technologies, Inc., Herndon, Va.; Copyright Registration No. TX 1-094-758 (1982, 1986). Although not essential, the modified light is usually detected and transformed to an electrical signal for convenience in later processing. As the final step in the sensing process, the electrical or optical signal is compared to a reference quantity to determine qualities of the physical phenomenon such as spatial location, amplitude, frequency, and other parameters.

Fiber optic sensor systems are assembled from four basic categories of equipment: optical sources, optical fibers, optical detectors, and processing circuitry.

Optical Sources:

The energy from common optical sources cover a narrow band of optical frequencies having common center wavelengths, such as 780, 850, 1300, and 1550 nanometers. In general, these sources produce either unmodulated (continuous wave/CW) or modulated optical energy. Both of these types of sources are useful in sensing applications. As an example, the output of a modulated source can vary in amplitude, frequency, or phase according to an applied electrical signal, while a CW source is fixed in these parameters. For example, optical reflectometers typically use pulses resulting from amplitude modulation of an optical source.

Optical sources are also distinguished from one another by a characteristic known as coherence. Light is "coherent" when it is in phase relative to all other light emerging from the optical source at that instant in time, and light is "incoherent" when it is out of phase relative to all other light emerging from the source at that time. For example, optical sources such as lasers are coherent, while optical sources such as light emitting diodes (LED's) are incoherent.

The fundamental difference between LED's and lasers is the use of partially reflecting end surfaces and cavity walls in lasers. This allows for rapid building of light intensity in the recombination region. When the light intensity becomes sufficiently high, stimulated emission begins. In contrast, light emission in LED's take place in the spontaneous emission region. Much higher emitted power levels are available with the use of lasers and marginal increases in current.

Other fundamental attributes of optical sources include wavelength and output power. Optical sources emit light over a narrow range of frequencies. This range is determined by the semiconductors chosen for fabrication of the device. Lasers may be manufactured to emit light over a more narrow range of frequencies than LED's through use of tuned reflectors and distributed feedback.

In some embodiments of the invention, laser devices produce higher output power levels than LED's. In addition, if light is needed over a narrow band of wavelengths, lasers may be more advantageous. However, LED's are typically cheaper than lasers and simpler in construction, and because the current needed to sustain a stimulated emission condition is a function of temperature, temperature control equipment is often required to operate lasers. LED's usually require no temperature stabilization when operated in normal temperature ranges.

Figures 2, 3:
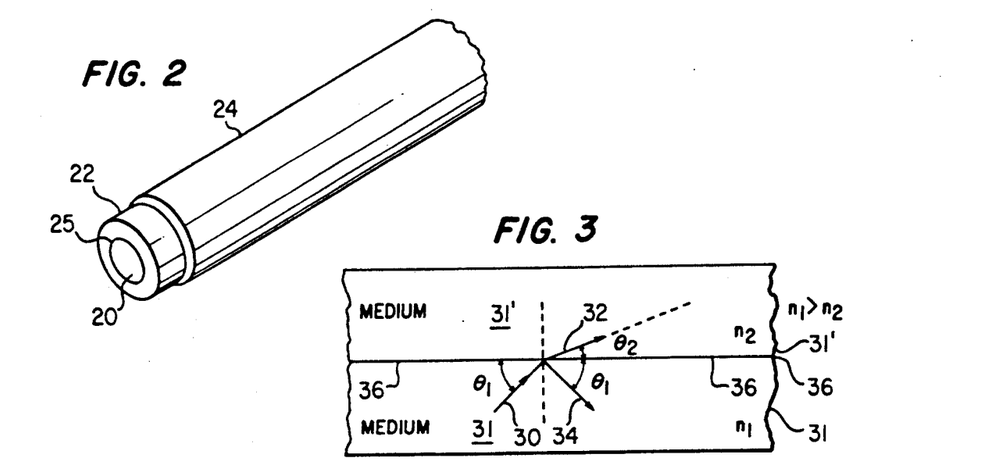
FIG. 2 shows the basic components of a fiber optic.
FIG. 3 is a cross section of two media having different indices of refraction, showing reflection and refraction at the interface between the media when light travels from a higher to a lower refractive index medium.

Optical Fibers:

Optical fibers consist of layered cylinders of optical materials with extremely small diameters. Three layers are typically used as shown in FIG. 2. The central cylinder, called the core 20, contains most of the optical energy in the fiber. Surrounding core 20 is clad 22, which confines light to core 20 due to its slightly different optical properties. Enclosing jacket 24 provides mechanical protection and support, but serves no optical function in most cases and is optional.

Referring now to FIG. 3, assume that a light ray 30 is incident at some angle $\Theta_1$ with the interface between two transparent media 31 and 31'.

A light ray 30 is propagated through media 31 and 31' as follows. When the angle of incidence of ray 30 at interface 36, $\Theta_1$, is large, part of ray 30 is reflected back into lower medium 31 (designated as ray 34) and part is transmitted into upper medium 31' (designated as ray 32). The relative intensities of rays 32 and 34 are determined by a material quantity known as the refractive index. The refractive index of any particular medium is defined as the ratio of velocity of light in a vacuum to the velocity of light in the medium. The refractive index of lower medium 31 in FIG. 3 is denoted as $n_1$ while the refractive index of upper medium 31' is denoted as $n_2$.

The angle of ray 32 transmitted into upper medium 31' is denoted as $\Theta_2$ and is determined by the indices of refraction for both materials according to Snell's law:

$$\cos(\Theta_2) = n_1 \cos(\Theta_1)/n_2$$

Assume that $n_1 > n_2$. If the incidence angle $\Theta_1$ is progressively decreased, angle $\Theta_2$ will also decrease to some point where no ray 32 is transmitted into medium 31' and ray 30 is totally reflected at medium interface 36. That angle is defined as the critical angle $\Theta_c$. The overall principle is known as total internal reflection. Total internal reflection will also occur for angles $\Theta_1$ that are less than critical angle $\Theta_c$.

Figure 4:
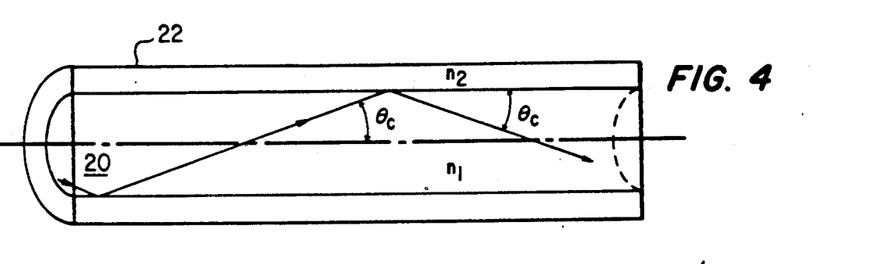
FIG. 4 shows a fiber optic in which a light ray is traveling through the fiber optic at the critical angle for total internal reflection.

Referring now to FIG. 4, to confine light to core 20, the index of refraction of core 20 is made slightly higher than the index of refraction of clad 22, so total internal reflection is attained for rays propagating at angles up to $\Theta_c$ relative to core/clad interface 35.

Light attenuates as it propagates in optical fibers, and attenuation in optical fibers can be divided into three categories. The first, material absorption, is due to the absorption of energy into the energy levels of impurities, such as iron, copper, or the like, as well as vibrational levels of hydroxyl and other ions that may be in core 20.

The second type of attenuation is due to bending losses in the fiber. These bending losses may in turn be separated into losses due to larger, gradual bends (macrobends) and losses due to much smaller and sharper bends (microbends). Macrobends may result from winding the fiber on a small diameter mandrel or stringing it (as in a truss) with a small radius of curvature. Microbends arise because of random variations in direction of the core axis and may be due to external forces, ripples in the core or clad, or other causes.

The third type of attenuation is due to scattering losses. These may be separated into Fresnel reflections, Rayleigh reflections, and much lower level Raman and Brillouin reflections. Fresnel reflections are comparatively very high level, usually due to breaks in the fiber. Rayleigh reflections are classically defined as occurring due to microscopic density fluctuations that are frozen into the core of the optical fiber as it cools after manufacture. In addition, the term refers herein to a broad range of mid-level reflections due to external forces and other parameters. Raman and Brillouin reflections are reflections from thermal photons and atomic quantum state transitions, respectively. These reflections are not usually significant until high optical intensities are used.

Figure 5:
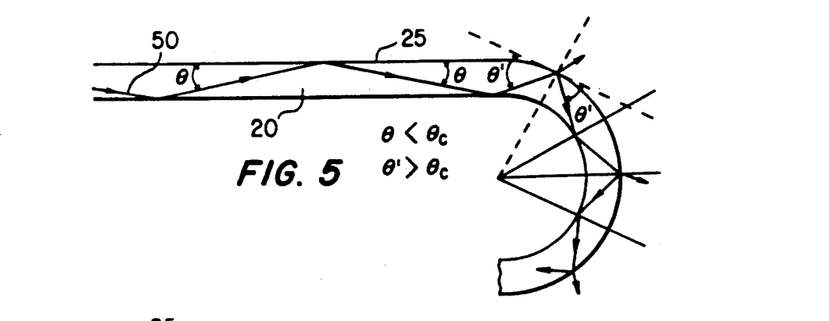
FIG. 5 shows the leakage of light from an optical fiber at a bend in the fiber.

In another embodiment of the invention, macrobends and microbends can be detected by measuring the total transmitted power. FIG. 5 illustrates the way macrobends result in power loss. As a ray 50 propagates at some angle $\Theta$ less than critical angle $\Theta_c$, ray 50 is totally confined. As ray 50 enters the bent region, the ray will intersect the core/clad interface 25 at some angle $\Theta'$ that is greater than critical angle $\Theta_c$, so part of ray 50 will be transmitted out of core 20. In one embodiment, power attenuation indicates the radius of curvature, so by measuring transmitted power through the fiber, the amount of bending is determined. For example, the more tight the bend, the greater the attenuation. In this embodiment, benchmarks of the amount of attenuation for a particular amount of bending are compared to actual measurements.

Figure 6:
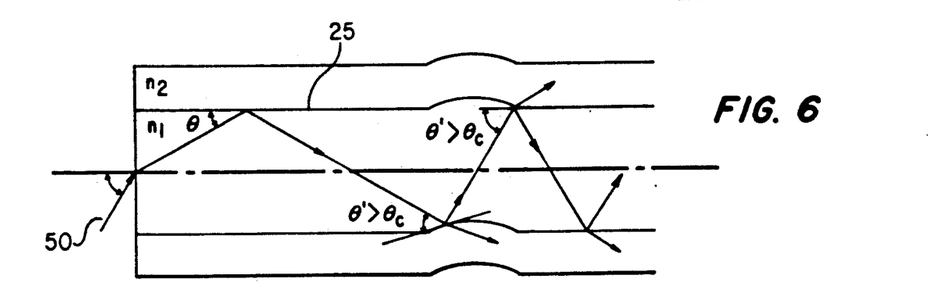
FIG. 6 shows losses due to microbends in a fiber optic.

FIG. 6 illustrates the way microbends result in power loss. Again, the microbend induces ray angle $\Theta'$ to be greater than critical angle $\Theta_c$ at interface 25, so losses will occur, and assuming that the amount of macrobending is known, microbending is detected in one embodiment by measuring the transmitted power. In additional embodiments, microbends and macrobends are measured by reflections back to the laser/LED.

Figure 7A:
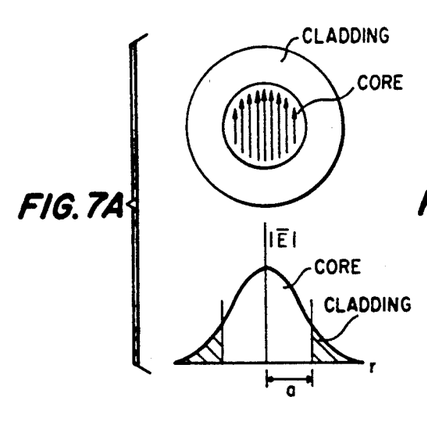
FIG. 7A shows a first mode or path in an optical fiber.
Figure 7B:
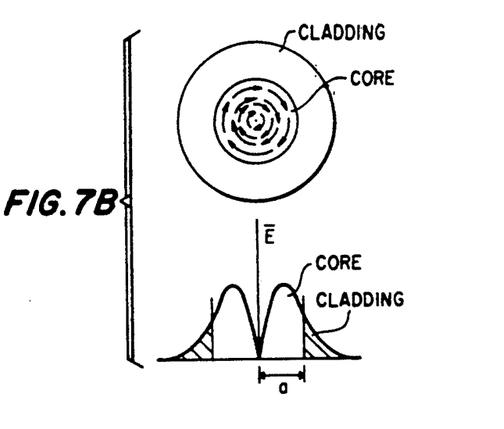
FIG. 7B shows a second mode or path in an optical fiber.

Yet another embodiment of the invention takes advantage of the fact that light propagates through a length of fiber in specific "paths" or "modes". For example, FIG. 7A shows a cross section of a fiber where optical intensity may peak at the middle and taper toward the edges of core 20 for one mode, while the optical intensity may peak in the middle of the radius and go to zero at the center and edges of core 20 for another mode, shown in FIG. 7B. Light propagating along one path or mode of the fiber does not interact with light propagating in another path, unless there is an irregularity in the fiber. The irregularity may be caused by any external parameter, such as strain. Therefore, by detecting the difference in optical characteristics between the modes when there is no external parameter and the modes in the presence of the external parameter, the external parameter is sensed. In one embodiment the optical characteristics monitored are the interference patterns between the two modes.

The amount of energy propagating in any given path is dependent on fiber geometry, optical wavelength, optical polarization, and other conditions. Larger fibers tend to be multimode, while smaller fibers can be manufactured so that just one mode propagates, called single mode fibers.

Materials used to manufacture the optical fibers will be chosen to meet mechanical strength and durability, as well as desired optical characteristics. Glass is commonly used for both the core and clad, along with an acrylate plastic coating. For higher temperature applications, materials such as sapphire or diamond can be substituted for the glass. Coatings such as polyimide and ceramic are commercially available for cases in which acrylate's strength and temperature resistance are not suitable. In addition, hermetic coatings may be applied to the surface of the fiber to seal the fiber against water and other contaminants.

Optical Detectors:

In some embodiments, optical detectors convert optical energy from the fiber to electrical signals that are processed further. Most optical detectors are made of silicon, while some are made of gallium arsenide. Commonly used detectors are made of combinations of p-type (doped with excess holes), intrinsic (undoped), and n-type (doped with excess electrons) semiconductors.

Two types of optical detectors are commonly used. In both, photons interact with the semiconductors to produce pairs of holes and electrons and, therefore, an electrical current is produced. One embodiment uses PIN (p-type/intrinsic/n-type) diodes. Another embodiment, in order to raise optical sensitivity, uses avalanche photodiodes (APD's). With APD's, a photon produces an electron/hole pair, which in turn may collide with the semiconductor lattice to produce more electron/hole pairs. As a result, a higher electrical current is produced in the semiconductor for each photon as compared to PIN diodes. The number of photons are detected by measurement of the increase in current.

In some embodiments, variations in optical intensity due to a parameter to be sensed may be extremely small. This would seem to indicate that a photon "amplifying" detector such as the APD should be used. In actual practice, APD's are highly dependent on temperature and tend to be "noisy" for low level optical signals. For this reason, a PIN diode is the detector of choice for some applications.

In an embodiment in which it is desired to measure spectral characteristics of the optical signal, the detector is combined with a tunable optical interferometer, such as a Fabry-Perot interferometer. An interferometer limits the optical energy received by the detector to a fine bandwidth in comparison to the total bandwidth of the optical energy and serves as an optical bandpass filter. Optical power at frequencies within the optical bandwidth is measured relative to power at other frequencies by retuning the interferometer. Measurements such as these allow for sensing of parameters such as strain and temperature in optical fibers which specifically alter the optical frequency as a function of the parameter measured.

Processing Circuitry:

Processing circuitry includes all hardware and software used to manipulate the electrical signals from the detector and convert them to meaningful sensor information. In one embodiment of the invention, the processing circuitry includes a signal monitor, such as a computer, with appropriate interfaces and software to collect the fiber optic sensor data; the electrical signal from the detector will be directly sampled and converted to a digital format for the computer. In another embodiment of the signal monitor, a Fabry-Perot or other type of interferometer will be used with a sample and hold circuit to sample detector voltage to yield optical intensity versus frequency information.

In all embodiments of the invention, a detected signal is compared to a reference (calibration) "baseline" in order to attach meaning to the signal. In one embodiment, the baselines are developed by computer-based cognitive methods such as neural networks. In another embodiment, the baselines are developed through measurement.

As used herein, "baselines" refer to an expected set of characteristics of the sensed transmitted or reflected signal. In measurement of static loads, an example of a baseline is the transmitted power of a light signal through the fiber in an unloaded state. In measurement of dynamic loads, an example of a baseline is a periodic transmitted signal in an unloaded state. In some embodiments, the baseline is stored in memory to be compared with measurements during operation of the system to detect the static or dynamic external parameter. In other embodiments, the baseline is not stored. For example, if two cores are included in one cladding, the difference in transmitted power between the two cores is the baseline. As a dynamic load is applied to the rope, the difference in the transmitted power between the two cores will change, resulting in detection of the dynamic load.

As desired precision, accuracy, and overall level of detail required for proper sensor function increases, the amount of memory and required throughput rate must increase. In some embodiments, the hardware will no longer be able to make timely comparisons of sensed optical signals to reference baselines due to high required throughput rates.

In other embodiments, pre-preprocessing of sensor data is used to alleviate this problem to some degree. In one embodiment, Fourier transforms are used to generate spectral-domain (magnitude and phase) information from large quantities of sampled, time-domain data. Baselines may describe quantities such as desired magnitude and phase at a specific frequency or a magnitude "band" in which all data should lie. In other embodiments, other domains and transforms to these domains may be used to decrease processing throughput requirements.

Sensing System Configurations:

In one embodiment of the invention, loads are monitored directly. In another embodiment, quantities such as temperature and pressure, are measured simultaneously. Loads are applied axially, radially, torsionally, or in combinations of the preceding with respect to the optical fiber. These loads are either static, random, or periodic with respect to time. If it is desired to characterize random or periodic loads, the Nyquist criterion will determine sampling rate requirements. This criterion states that if a waveform is to be reconstructed after sampling, that waveform must be sampled at twice the fundamental frequency. For example, a 30 Hertz (Hz) periodic load must be sampled at 60 Hz to allow later reconstruction and analysis.

In addition to variation in time, loads can vary over the length of the optical fiber (spatially). Processes that may be used to sense loads include:

A. Optical Time Domain Reflectometry (OTDR)—This technique is typically used to detect and locate breaks resulting in Fresnel reflections within long-haul fiber optic telephone lines. The equipment usually consists of a laser, timing circuitry, detector, and display as shown in FIG. 8.

Figure 8:
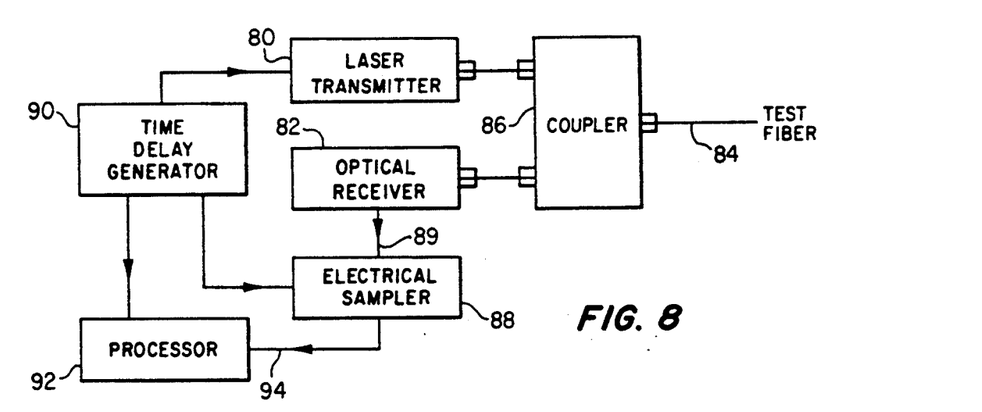
FIG. 8 is a schematic of an embodiment of circuitry for use in the invention, including a signal monitor system.

In FIG. 8, laser transmitter 80 and optical receiver 82 are attached to test fiber 84 through coupler 86. In this embodiment, laser transmitter 80 transmits light into test fiber 84 via coupler 86, and optical receiver 82 receives the reflections created by breaks or other loads on fiber 84. Optical receiver 82 converts the light received into electrical signals which are then sampled by electrical sampler 88. In reference to the optical transmitter/receiver, delays in time between transmission and reception of an optical pulse correspond to a specific location on the fiber. By proper control of the electrical sampler relative to the time that the optical pulse is launched, a length of fiber may be examined for reflections. In this embodiment, electrical sampler 88 is controlled by time delay generator 90 so that time delay generator 90 turns on electrical sampler 88 to sample any reflections that have had time to reflect from a given point in fiber 84. For example, if it is desired to detect breaks at a distance d from transmitter 80, time delay generator 90 turns on sampler 88 after the pulse has had time to travel a distance of 2d.

Processor 92, in some embodiments, comprises a computer, which receives information regarding the reflections from electrical sampler 88. In one embodiment, processor 92 also comprises a means for comparing signals to baselines stored in a memory and a means for displaying the result of that comparison.

In one embodiment, processor 92 comprises an OTDR which displays a trace of reflected power divided by baseline power on one axis, and distance on the other axis. When a break occurs, there is a peak in the display.

In a further embodiment, time delay generator 90 triggers transmitter 80 and sampler 88 in a sequence such that the entire length of fiber 84 is scanned for breaks.

In yet another embodiment, test fiber 84 is included in a rope structure, wherein both ends of the optical fiber will produce Fresnel reflections. If the index of refraction for the core is known, as well as physical dimensions of the core such as cross-sectional area, and the elapsed time between reflections is known, the length of the fiber is calculated. Applied axial load is calculated if modulus of the fiber is known and data from an unstressed OTDR optical fiber measurement is stored as a baseline. Normalization of the loaded OTDR data by the baseline OTDR data will result in peaks, corresponding to areas of increased reflection amplitude over the baseline. Precision of this measurement is determined by optical pulse width. The shorter the pulse, the more accurate the measurement of amount of strain will be at a given location in the fiber.

OTDR/Spliced Optical Fiber—In another embodiment, a technique is used that is the same as basic OTDR measurements, with the exception that a length of spliced optical fiber is used. Since these splices also result in Fresnel reflections, a calculation similar to the basic OTDR technique is completed to calculate axial load for each section. Axial load on the optical fiber as integrated over a spliced length is calculated from the modulus, according to the following formulas:

$$\sigma = Y\epsilon$$

where:
Y = Young's modulus of the fiber core,
$\sigma$ = the stress applied to the fiber over the splice length, and
$\epsilon$ = the strain applied to the fiber over the splice length due to the load.

$\epsilon$ is found according to the formula:

$$\epsilon = \frac{\Delta X}{X}$$

where:
$\Delta X$ = the change in fiber length between a loaded and unloaded state, and
X = the fiber length in the unloaded state.
Solving the above equations for stress $\sigma$ yields:

$$\sigma = \frac{Y(\Delta X)}{X}$$

Axial load is related to stress by the formula:

$$L = A\sigma$$

where:
L = axial load, and
A = the area of the core of the fiber.

It is not necessary (and may in fact be detrimental) to have splices that are periodic along the optical fiber. Since this is true, a length of spliced fiber may be fabricated to monitor loads at fine intervals in some sections and large intervals in other sections, corresponding to areas of high structural concern and low structural concern respectively. Since each splice reflects some quantity of optical power, input optical power will increase as the number of sensed locations increases.

Photon-Counting OTDR/Macrobends—In yet another embodiment, macrobends in an optical fiber may be used in exactly the same sense as splices to determine axial loads in sections between the macrobends. Macrobends are typically introduced by running the rope through a stringer, pulley, or other relatively circular form with a small enough radius of curvature. Each macrobend will produce a drop in reflected optical intensity. Since these drops will usually be small in magnitude, a technique called "photon counting" increase detector sensitivity. An example of the photon counting process is disclosed in Garside, B.K., "A Photon Counting Optical Time-Domain Reflectometer for Distributed Sensing Applications." B. K. Garside and R. E. Park, *Society of Photo-Optical Instrumentation Engineers*, "Proceedings of Fiber Optic and Laser Sensors VII," Vol. 1169, Paper 11, held Sep. 5-8, 1989 in Boston, Mass., Editors: Eric Udd, Raymond P. DePaula.

C. Photon-Counting OTDR/Microbends—In another embodiment, microbends in an optical fiber may be used to determine axial loads in an optical fiber similar to macrobends and splices. Microbends are typically induced through pressure applied by crossing structural fibers in the braid of the rope, or other spatially "sharp" loads. As in macrobends, each microbend will produce a drop in reflected optical intensity, and photon-counting is used in this embodiment to detect the drop in intensity.

D. OTDR/Bragg Grating Fiber—In yet a further embodiment, Bragg gratings are induced at semi-discrete locations in the fiber and used in the same way as splices with an OTDR. The Bragg gratings used in this embodiment are essentially partially reflective mirrors over a narrow range of wavelengths. In one embodiment, the gratings are induced using a high-powered ultraviolet (UV) laser with properly doped fiber. The gratings are produced after illumination by the UV laser through the fiber "wall," as described in Meltz, et al., "Formation of Bragg Gratings In Optical Fibers By a Transverse Holographic Method," *Optical Letters*, Vol. 14, No. 15, p. 823 (Aug. 1, 1989).

Figure 9:
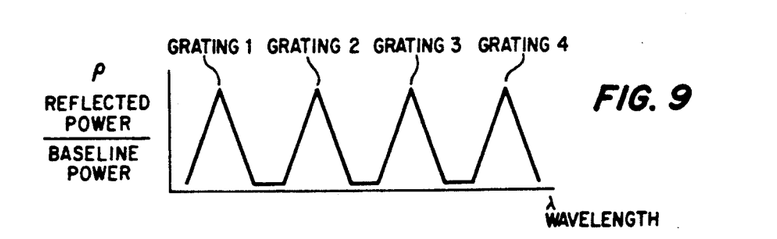
FIG. 9 shows that Bragg gratings can be fabricated in optical fibers with differing peak reflectivities.
Figure 10:
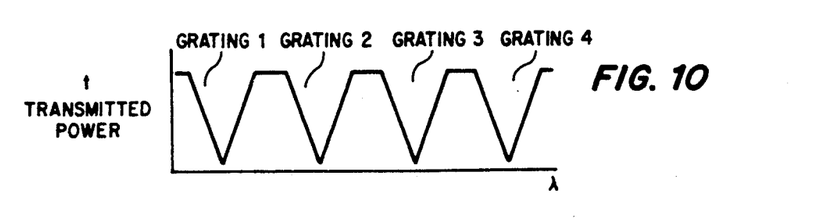
FIG. 10 shows dips in transmitted optical power at Bragg grating wavelengths.

E. Tuned Reflector/Bragg Grating Fiber—In still another embodiment, Bragg gratings are fabricated in optical fibers with differing peak reflectivities as shown in FIG. 9. A particular grating may be made highly reflective at a specific wavelength and highly transmissive at other wavelengths. If different gratings are fabricated in a fiber with slightly differing reflective wavelengths, this fiber may be used as a sensor. First, a broadband (several contiguous wavelength) source is "launched" into one end of the fiber. If the opposite end of the fiber is connected to an optical spectrum analyzer covering the proper band of wavelengths, dips in optical power will appear at each Bragg grating wavelength as shown in FIG. 10. Furthermore, if the fiber at an individual Bragg grating is strained axially, that strain will produce a proportional change in filter wavelength of the Bragg grating. Axial load on the optical fiber at that point is calculated from the modulus, according to the following formulas:

$$\sigma = Y\epsilon$$

where
Y = Young's modulus of the fiber core,
$\sigma$ = the stress applied to the fiber at the Bragg grating due to the load, and
$\epsilon$ = the strain applied to the fiber across the Bragg grating due to the load.

For a given reflectivity profile corresponding to a Bragg grating at wavelength $\lambda$, $\epsilon$ is found according to the formula:

$$\epsilon = \frac{\Delta\lambda}{K}$$

where: $\Delta\lambda$ = the change in the wavelength of the peak for a particular grating between a loaded and unloaded state, and
K = a proportionality constant, is determined during calibration of this embodiment of the invention.

For example, if a known strain is applied to the fiber, and the Δλ is observed, K is calculated as Δλ/ε. During operation of the system, K will be assumed to be constant. Solving the above equations for stress σ yields:

$$\sigma = \frac{Y(\Delta\lambda)}{K}$$

Axial load is related to stress by the formula:

$$L = A\sigma$$

where:
L = axial load, and
A = the area of the core of the fiber.

F. Dual Fiber Sensor—In another embodiment, optical fibers are produced with closely located cores. Optical energy propagating through the cores oscillates from one core to the other as a result of phase interference and other phenomena. Stimuli which have differential effects on the two fibers can be distinguished by forming a ratio of the amount of power in one core relative to the other at the optical output. These stimuli include axial strain, radial strain, and temperature.

G. Modal Domain/Polarization Sensor—In yet another embodiment, multimode fibers are used in which light propagates through the fiber in different modes or paths, where these modes do not naturally interfere. These modes may be polarization, spatial, or other types of modes. Changes in interference between modes indicate environmental parameters to be monitored. This interference is due to phase differences induced in the two separate modes by such factors as slight differences in indices of refraction.

The invention has many uses. For example, a rope containing a fiber optic may be used as a tensile load bearing member in a truss or wing of an aircraft. Strain and loads on the truss or wing may be indirectly monitored by monitoring the load on the fiber optic. In addition, the invention can be applied to other structural applications such as bridge cables, elevator cables, cranes, boom trusses, electrical power distribution cables, ski lifts, and lightweight space structures.

The above embodiments and applications of the invention are provided by way of example only, and it is expected that other embodiments will occur to those skilled in the art that do not depart from the spirit of the invention.

I claim:

1. A system for detecting tensile loads on a rope comprising:
   a plurality of elongated load-bearing members, said elongated load-bearing members being arranged into an elongated shape of a rope, said elongated shape having a long axis, said elongated shape being capable of a change in length along the long axis and structured for bearing tension loads along the long axis;
   at least one fiber optical incorporated with the elongated load-bearing members along the length thereof;
   an input signal transmitter, said input signal transmitter transmitting electromagnetic radiation into said fiber optic; and
   a signal monitor, said signal monitor monitoring electromagnetic radiation exiting from said fiber optical and comparing an observed set of characteristics of the electromagnetic radiation exiting from said fiber optic to an expected set of characteristics of electromagnetic radiation exiting from said fiber optic.

2. A system as in claim 1 wherein said input signal transmitter comprises a coherent light source.

3. A system as in claim 1 wherein said input signal transmitter comprises an incoherent light source.

4. A system as in claim 1 wherein said signal monitor monitors electromagnetic radiation that is transmitted through said fiber optic.

5. A system as in claim 1 wherein said signal monitor monitors electromagnetic radiation that is reflected from said fiber optic.

6. A system as in claim 1 wherein said fiber optic is a multimode fiber optic.

7. A system as in claim 1 wherein said fiber optic is a single mode fiber optic.

8. A system as in claim 1 wherein said fiber optic has a core and a cladding.

9. A system as in claim 8 wherein said core has substantially the same index of refraction for a given frequency of electromagnetic radiation for substantially the entire length of said core.

10. A system as in claim 8 wherein said core has differing indices of refraction for different frequencies at various locations along the length of said core.

11. A system as in claim 1 wherein said fiber optic contains Bragg gratings.

12. A system as in claim 1 wherein said fiber optic is constructed from a series of spliced pieces of fiber optic.

13. A system as in claim 1 wherein said fiber optic has a plurality of cores.

14. A system as in claim 1 wherein said signal monitor comprises a Fresnel reflection detector.

15. A system as in claim 1 wherein said signal monitor comprises a Rayleigh reflection detector.

16. A system as in claim 1 wherein said signal monitor comprises a Raman reflector detector.

17. A system as in claim 1 wherein said signal monitor comprises a Brillouin reflection detector.

18. A system as in claim 1 wherein said plurality of elongated members bears tension loads in a structural element.

19. A system as in claim 18 wherein said structural element is a truss.

20. A process for detecting tensile loads on a plurality of elongated load-bearing members, said elongated load-bearing members being arranged in an elongated shape of a rope, said elongated shape having a long axis, said elongated shape being capable of a change in length along the log axis and structured for bearing tension loads along the along axis, at least one of said elongated load-bearing members being a fiber optic, said process comprising the steps of:
   1) positioning said rope so as to be subjected to a tension load along the long axis;
   2) transmitting a reference input signal into the fiber optical of the thus positioned rope;
   3) monitoring the resulting transmitted reference output signal exiting the fiber optical of the thus positioned rope;
   analyzing the change between the characteristics of the reference input signal and the characteristics of the reference output signal exiting the fiber optic of the thus positioned rope to detect the tensile load on the thus positioned rope.

21. The process of claim 20 wherein said analyzing step further comprises the step of:

comparing the characteristics of the reference input signal to the characteristics of the reference output signal exiting the fiber optic of the thus positioned rope to determine the presence of a continuing tensile load on the thus positioned rope.

22. The process of claim 20 wherein said analyzing step further comprises the step of:

comparing the characteristics of the reference input signal to the characteristics of the reference output signal exiting the fiber optical of the thus positioned rope to determine the past occurrence of a non-continuing tensile load on the thus positioned rope.

23. The process of claim 22 wherein the reference output signal comprises a reflected reference signal.

24. The process of claim 22 wherein the reference output signal comprises a transmitted reference signal.

25. The process of claim 20 wherein said analyzing comprises OTDR.

26. The process of claim 20 wherein said analyzing comprises OTDR/spliced optical fiber.

27. The process of claim 20 wherein said analyzing comprises Photon-Counting OTDR/Macrobends.

28. The process of claim 20 wherein said analyzing comprises Photon-Counting OTDR/Microbends.

29. The process of claim 20 wherein said analyzing comprises OTDR Bragg Grating.

30. The process of claim 20 wherein said analyzing comprises Tuned Reflector/Bragg Grating.

31. The process of claim 20 wherein said analyzing comprises Dual Fiber Sensor.

32. The process of claim 20 wherein said analyzing comprises Modal Domain/Polarization.

33. The process of claim 20 wherein the reference output signal comprises a Fresnel reflection.

34. The process of claim 20 wherein the reference output signal comprises a Rayleigh reflection.

35. The process of claim 20 wherein the reference output signal comprises a Raman reflection.

36. The process of claim 20 wherein the reference output signal comprises a Brillouin reflection.

37. A device for sensing tensile loads on a rope comprising:

an optical fiber, said optical fiber being integral with the rope along the length of the rope;

an optical source, connected to said optical fiber to transmit a signal into said optical fiber;

an optical detector connected to said optical fiber to receive an exit signal from said optical fiber and provide an output signal; and a processor to receive said output signal from said optical detector and compare said output signal to an expected output signal.

38. A device as in claim 37 in which said optical detector comprises a Fabry-Perot interferometer.

* * * * *

UNITED STATES PATENT AND TRADEMARK OFFICE
CERTIFICATE OF CORRECTION

PATENT NO. : 5,182,779
DATED : January 26, 1993
INVENTOR(S) : William L. D'Agostino, ET AL It is certified that error appears in the above-identified patent and that said Letters Patent is hereby corrected as shown below:

Column 1, lines 12 - 13, change "ropes, ropes, and cables" to --ropes, wire ropes, and cables--;
          line 14, change "wire rope, cable." to --wire rope, and cables--.
Column 11, line 6, change "OTDR/Spliced" to --B. OTDR/Spliced--;
           line 53, change "Photon-counting" to --C. Photon-Counting--.
Column 12, line 50, change "where" to --where: --.
Column 13, line 58, change "optical" to --optic--;
           lines 65 - 66, change "optical" to --optic--.
Column 14, line 51, change "log axis" to --long axis--.

UNITED STATES PATENT AND TRADEMARK OFFICE
CERTIFICATE OF CORRECTION

PATENT NO. :   5,182,779
DATED      :   January 26, 1993
INVENTOR(S):   William L. D'Agostino, ET AL It is certified that error appears in the above-identified patent and that said Letters Patent is hereby corrected as shown below:

Column 14, line 52, change "along axis" to --long axis--;
          line 58, change "optical" to --optic--;
          line 60, change "optical" to --optic--;
          line 62, change "analyzing" to --4) analyzing--.
Column 15, line 10, change "optical" to --optic--.

Signed and Sealed this

Eighteenth Day of January, 1994

Attest:

BRUCE LEHMAN

*Attesting Officer*     *Commissioner of Patents and Trademarks*